(12) United States Patent
Meeuse et al.

(10) Patent No.: US 11,510,418 B2
(45) Date of Patent: Nov. 29, 2022

(54) PROCESS FOR MIXING LIQUID EDIBLE OIL AND A MELTED EDIBLE FAT

(71) Applicant: UPFIELD EUROPE B.V., Rotterdam (NL)

(72) Inventors: Frederik Michiel Meeuse, Vlaardingen (NL); Robert Beltman, Vlaardingen (NL); Ozgur Gunyol, Vlaardingen (NL)

(73) Assignee: UPFIELD EUROPE B.V., Rotterdam (NL)

( * ) Notice: Subject to any disclaimer, the term of this patent is extended or adjusted under 35 U.S.C. 154(b) by 435 days.

(21) Appl. No.: 16/633,533

(22) PCT Filed: Apr. 10, 2018

(86) PCT No.: PCT/EP2018/059107
§ 371 (c)(1),
(2) Date: Jan. 23, 2020

(87) PCT Pub. No.: WO2019/020222
PCT Pub. Date: Jan. 31, 2019

(65) Prior Publication Data
US 2021/0127699 A1 May 6, 2021

(30) Foreign Application Priority Data
Jul. 24, 2017 (EP) .................................... 17182788

(51) Int. Cl.
| *A23D 9/04* | (2006.01) |
| *A23D 7/04* | (2006.01) |
| *B01F 23/45* | (2022.01) |
| *B01F 23/40* | (2022.01) |
| *B01F 25/10* | (2022.01) |
| *B01F 101/40* | (2022.01) |

(52) U.S. Cl.
CPC ................. *A23D 9/04* (2013.01); *A23D 7/04* (2013.01); *B01F 23/405* (2022.01); *B01F 23/45* (2022.01); *B01F 25/10* (2022.01); *B01F 2101/40* (2022.01)

(58) Field of Classification Search
CPC . A23D 9/04; A23D 7/04; A23D 7/001; A23D 7/02; B01F 23/405; B01F 23/45; B01F 25/10; B01F 2101/40
See application file for complete search history.

(56) References Cited

U.S. PATENT DOCUMENTS 1,445,427 A 2/1923 Werner

FOREIGN PATENT DOCUMENTS

| EP | 0186578 A2 | 12/1985 |
| EP | 1795257 A1 | 6/2007 |
| GB | 736710 | 9/1955 |
| WO | 2015086760 A1 | 6/2015 |
| WO | 2016188709 A1 | 12/2016 |
| WO | 2017084910 A1 | 5/2017 |

OTHER PUBLICATIONS

International Search Report dated Jun. 29, 2018 regarding PCT/EP2018/059107.

*Primary Examiner* — Deborah D Carr
(74) *Attorney, Agent, or Firm* — ArentFox Schiff LLP

(57) ABSTRACT

A process for mixing two or more streams of liquid oil which can be operated continuously, using a multi-inlet vortex mixer. The process is well suited to a process in which at least two streams of liquid oil have a different temperature, one being oil liquid at room temperature, one being solid at room temperature, but being melted for the mixing process.

16 Claims, 1 Drawing Sheet

PROCESS FOR MIXING LIQUID EDIBLE OIL AND A MELTED EDIBLE FAT

Figure 1:
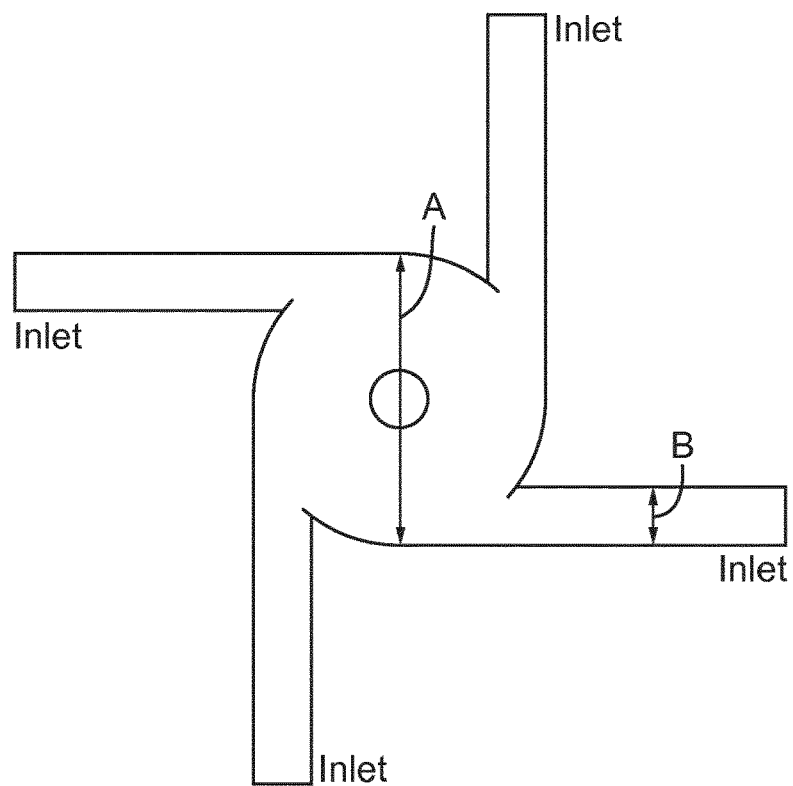

This is a national phase entry of PCT/EP2018/059107 filed Apr. 10, 2018, which claims priority to European Patent Application No. 17182788.4 filed Jul. 24, 2017, the entire contents of each of which is hereby incorporated by reference in its entirety.

FIELD OF THE INVENTION

The present invention relates to a process for mixing two or more streams of liquid oil, and which process can be operated continuously. More specifically, the invention relates to such process in which at least two streams of liquid oil have a different temperature, one being oil liquid at room temperature, one being solid at room temperature, but being melted for the mixing process. Said mixing can be carried out using a multi-inlet vortex mixer.

BACKGROUND OF THE INVENTION

Fat continuous food products are well known in the art and include for example shortenings comprising a fat phase and water in oil spreads like margarine comprising a fat phase and a dispersed aqueous phase. Such shortenings and spreads are generally solids (i.e. not liquid), and such products generally comprise a structured fat phase. The fat phase is structured e.g. to stabilize the emulsion and to give a certain firmness to the product.

Next to these solid structured fat-continuous food products there are liquid fat-based food products, such as liquid margarines. Liquid margarines that are fat-continuous are known both in a water-free version and in the form of an emulsion (e.g. from 3 to 40% of dispersed water phase). These liquid margarines are generally intended as products for shallow-frying or sauteing, and they are often products with a structured fat-phase. The fat-phase of liquid margarines can be structured e.g. for stabilizing a dispersed water phase (for w/o emulsions) or e.g. for stabilizing dispersed solid matter, such as salt or herbs.

The fat-phase of such structured fat-based liquid margarines generally comprises liquid (vegetable) oil and a structuring agent or hardstock. Such structuring agent or hardstock is generally a fat which is solid at ambient temperatures (e.g. 20° C.) and liquid at temperatures of e.g. 100° C., and which is present in the product at ambient temperatures in the form of small fat crystals. Such small fat crystals, when in the right form, amount, size, etcetera, can stabilize the dispersion or emulsion. Typical edible fats used as hardstock for liquid margarines include fully hardened vegetable oils such as fully hardened rapeseed oil, fully hardened sunflower oil, and the like.

Generally edible fat continuous food products like shortenings and margarines, including liquid margarines, are prepared according to prior art processes that encompass the following steps:
1. Mixing of the liquid oil, the structuring fat and if present the aqueous phase at a temperature at which the structuring fat is definitely liquid;
2. cooling of the mixture under high shear to induce crystallization of the structuring fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

A disadvantage of these processes is that the complete composition (including the liquid oil, structuring fat and if present the aqueous phase) is subjected to a heating step and a cooling step. This requires a lot of energy. A further disadvantage of the known processes is that the product or ingredients may deteriorate due to the changes in temperature caused by the heating and cooling step.

Alternative processes have been described wherein the structuring fat is added as fat powder (i.e. crystallized fat) thereby eliminating the need to heat the whole composition to above the melting temperature of the structuring fat.

EP 1865786 and EP 1795257 disclose processes for the preparation of a spreadable edible dispersion wherein a mixture of oil and solid structuring agent particles is subjected to stirring to produce a fat slurry of fat crystals in oil. Subsequently an aqueous phase is gradually added to the mixture until a dispersion is obtained.

In a variant on the above process, a fat slurry of fat crystals dispersed in liquid oil can also be obtained by blending cold liquid oil (e.g. sunflower oil, e.g. at a temperature of 15° C.) with a hardstock in melted form (e.g. an interesterified fat blend of a mixture of 65% dry fractionated palm oil stearin with an Iodine Value of 14 and 35% palm kernel oil, at a temperature of 40° C.). Such slurry can be mixed with water to form an emulsion quite similar as in the processes of EP 1865786 and EP 1795257. WO2016/188709 discloses a process to make slurries of hardstock crystals in oil in a batch-wise way, or in a continuous way using an FDM mixer. The slurries so-obtained can be emulsified with an aqueous phase to form an oil-continuous emulsion in a similar fashion as the slurries prepared by the mixing of oil with micronized fat powders as set out above. The above process works well for spreadable emulsions (which beneficially have a wide range of sizes of the hardstock fat crystals: smaller ones for stabilizing the emulsion, larger ones for giving firmness to the product).

There is now a need for an efficient process to be able to continuously mix a stream of liquid cold oil with a stream of melted hardstock fat to produce slurries of fat crystals in oil, preferably on an industrial scale. Preferably, the fat crystals should be fairly small and uniform in size (more uniform than obtained with the processes in EP 186578, EP 1795257 and WO2016/188709, as that results in favourable properties of the liquid margarines made of such oil-hardstock blend).

SUMMARY OF THE INVENTION

Hence, it is an object of the present invention to provide a process to continuously mix a stream of liquid cold oil with a stream of melted hardstock fat to produce slurries of fat crystals in oil, preferably on an industrial scale. Preferably, the fat crystals in such slurries should have a particle size which is fairly small and uniform in size (more uniform than obtained with the processes in EP 186578, EP 1795257 and WO2016/188709). The average size of the fat platelets in a fat slurry as obtained via SAXS measurements is preferably below 25 nm.

It has now been found that such can be conveniently achieved by a process for continuously mixing a first liquid edible oil and a second liquid edible oil in a mixing apparatus, wherein the first liquid edible oil is liquid at 15° C. and which first liquid edible oil enters the mixing apparatus at a temperature of between −10° and 25° C., and wherein the second liquid edible oil is solid at 15° C. and liquid at 75° C. and which second liquid edible oil enters the mixing apparatus at a temperature of between 30° and 110° C., and wherein the flow rate of the first liquid edible oil fed to the mixing apparatus is 5 to 100 times the flow rate of the second liquid edible oil fed to the mixing apparatus, and characterised in that the mixing apparatus is a multi-inlet vortex mixer having at least three inlets.

DETAILED DESCRIPTION OF THE INVENTION

The invention encompasses a process using a multi-inlet vortex mixer. A multi-inlet vortex mixer is known in the art of mixing equipment, and is a static mixer which can be used in a continuous process of mixing at least two pumpable liquids. It has a fairly small mixing chamber, with at least two inlets, often more, e.g. four, and an exit (generally one). The shape of the mixing chamber and the position of the inlets and outlet is generally selected such that a vortex flow of the liquids is created, as such facilitates good mixing. The exit of the mixing chamber is preferably located such that it is not in the same plane as the inlets. A typical arrangement is a disk-like (i.e. a flat drum) mixing chamber with the inlets (e.g. evenly spaced) arranged at the circumference of the mixing chamber, and the exit being located on the axis of the mixing chamber (perpendicular to the inlets).

"Multi-inlet" herein means that the mixing chamber of the mixer has at least two points of entry for components to be fed to the mixer. Preferably, the multi-inlet vortex mixer in the present invention has from 3 to 9 inlets, more preferably has from 3 to 6 inlets, most preferably it has 3 or 4 inlets. An example of a vortex mixer with four inlets is displayed in FIG. 1 (top view) and FIG. 2 (side view).

The process according to the present invention is very suitable for mixing streams of two liquid edible oils of which one has a much higher melting point than the other, and which has the purpose to create a dispersion or slurry of small fat crystals in oil, e.g. on an industrial scale. For example, the first liquid edible oil may be a non-hardened vegetable oil which is liquid at e.g. 20° C. like sunflower oil, bean oil, rapeseed oil, linseed oil, and mixtures thereof, whilst the second liquid edible oil is a vegetable fat solid at e.g. 20° C., such as e.g. fully hardened vegetable oils like fully hydrogenated rapeseed oil or fully hydrogenated sunflower oil. By having such first and second liquid edible oils, and in particular when the flow rate of the first liquid edible oil is between 5 to 100 times that of the second liquid edible oils, a dispersion of fat crystals of predominantly the second liquid edible oil dispersed in a liquid oil which is predominantly the first liquid edible oil can be obtained. Such dispersion can suitable be used in or as a liquid margarine (with or without water dispersed in such). The above is the reason why the first liquid edible oil and the second liquid edible oil have a different temperature at which they are solid, and it is also the reason why the process is about mixing two liquid oils which are at different temperatures. In the present invention, the first liquid edible oil preferably is a vegetable oil or mixture of vegetable oils. Likewise, in the present invention the second liquid edible oil is preferably a fully hardened vegetable oil (which is melted for the process in order to make it liquid).

In the process according to the present invention and in view of what is explained above, it is preferred that the first liquid edible oil enters the mixing apparatus at a temperature of between −5° and 20° C. Likewise, it is preferred that the second liquid edible oil enters the mixing apparatus at a temperature of at least 40° and not higher than 20° C. above the temperature at which all of the second liquid edible oil is melted.

In the process according to the present invention the first liquid edible oil and the second liquid melted edible oil fat are preferably fed to the multi-inlet vortex mixer at a pressure of between 5 and 100 bar, preferably at a pressure of between 8 and 80 bar, more preferably at a pressure of between 10 and 50 bar, using pumps that can pump liquids at the required pressure and flow rate.

A typical feature of the mixing of two or more liquid streams using a multi-inlet vortex mixer is the very short residence time of the liquids. In the present situation, such is beneficial for the formation of small fat crystals. Hence, in the present invention it is preferred that the residence time of the liquid edible oils in the multi-inlet vortex mixer is from 0.001 to 0.5 seconds, preferably from 0.002 to 0.2 seconds.

In a preferred arrangement for mixing the liquid oils in the present invention the second liquid edible oil is fed to the multi-inlet vortex mixer through one inlet, and the other inlets are used for feeding to the mixer the liquid edible oil. That said, the second liquid edible oil may be fed on its own through one inlet, or as a mixture with 5 to 80% (by weight, on what is fed through this inlet) of the first liquid edible oil. This is particularly advantageous if the resulting mixture is to contain only a small amount (e.g. 2-5%) of the second edible oil, as such would require a much reduced flow rate compared to the one or more inlets with the first liquid edible oil, which is more difficult to handle and/or may lead to less than optimal mixing. Therefore, diluting the second liquid edible oil with some (5-80% by weight of the mixture fed through one inlet) of the first liquid edible oil can be advantageous.

Multi-inlet vortex mixers are known for mixing aqueous components. The invention now also relates to the use of a multi-inlet vortex mixer for mixing a first liquid edible oil and a second liquid edible oil, wherein the first liquid edible oil has a temperature at least 10° C. lower than the temperature of the second liquid edible oil. More specifically in such, it is preferred that the first liquid edible oil is liquid at 15° C. and wherein the second liquid edible oil is solid at 15° C., for reasons set out above. For such use, it is preferred that the second liquid edible oil is fed to the multi-inlet vortex mixer through one inlet, and consequently the other inlets are used for feeding the first liquid edible oil to the mixer. Still, as stated above, in such use it can be beneficial to dilute the second liquid edible oil with some (5-80% by weight of the mixture fed through one inlet) of the first liquid edible oil. In the use according to the present invention the use preferably relates to the mixing being a continuous process.

FIGURES

FIG. 1: top view of a vortex mixer with four inlets. "A" is the diameter of the mixing chamber; "B" is the diameter of an inlet.

Figure 2:
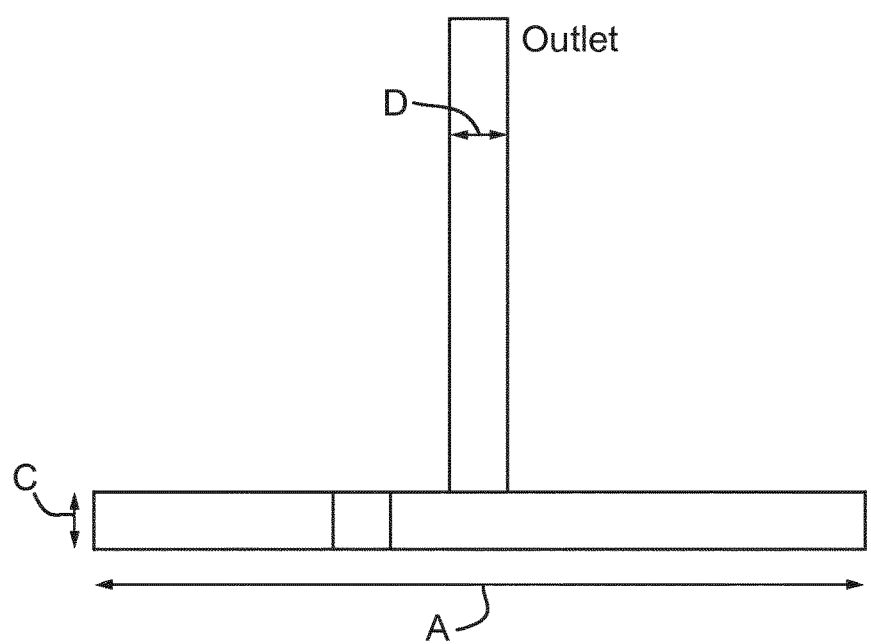

FIG. 2: side view of a vortex mixer with four inlets. "A" is the diameter of the mixing chamber; "C" is the height of the mixing chamber; "D" is the diameter of the outlet.

EXAMPLES

Four fat slurries have been made: examples 1 and 2 according to the invention, A and B as comparatives. The slurries were composed of an oil liquid at room temperature and a structuring fat (a hardstock, i.e. a fat solid at room temperature), more specifically fully hardened rapeseed oil (RP70). Such slurries, when properly produced and at room temperature, are oil with dispersed in such crystallised fat. The overall composition of the fat slurries made in examples A and B and comparative examples 1 and 2 is given in Table 1.

TABLE 1

| Ingredient | Level |
| --- | --- |
| Sunflower oil | 98% |
| RP70 | 2% |

For examples 1 and 2 a fat slurry was made in a vortex mixer with four inlets. The geometry of this vortex mixer is shown in FIGS. 1 and 2. In FIG. 1 (top view of a 4-inlet vortex mixer), the diameter A of the mixing chamber is 7.8 mm, the height C of the mixing chamber (FIG. 2) is 1.2 mm, and the diameter of the inlets (B) is 1.2 mm, and the diameter of the outlet is also 1.2 mm.

The composition of the fat phases used for experiments 1 and 2 can be found in Table 2 (weight % on the total fat phase). Fat phase 1 was split equally over three of the four inlets. In the fourth inlet fat phase 2 was added. The fat phases were fed to the inlets with pumps. The inlet temperatures can be found in Table 2. The total flowrate was 180 kg/h.

TABLE 2

|  | Example 1 | Example 2 |
| --- | --- | --- |
| Fat phase 1 |  |  |
| Sunflower oil | 96% | 94% |
| Inlet temperature | 6.7° C. | −3.?° C. |
| Fat phase 2 |  |  |
| Sunflower oil | 2% | 4% |
| RP70 | 2% | 2% |
| Inlet temperature | 85° C. | 85° C. |

Comparative Examples A and B

Comparative examples A and B were made with a series of votators (scraped surface heat exchangers). First a premix is made of all ingredients given in Table 1. This premix at a temperature of 60° C. was cooled in a series of three surface scrapped heat exchangers to a temperature of around 15° C. Table 3 shows the detailed operating conditions.

TABLE 3

| Example | flowrate | Temperature of slurry at exit |
| --- | --- | --- |
| 1 | 50 kg/h | 16.1° C. |
| 2 | 150 kg/h | 15.8° C. |

Results

The amount of oil exudation from the slurries was measured by visual inspection of the height of the layer of free oil on top of the sample. The oil exudation was measured after storing the samples for 5 weeks at 30° C., see table 4 for the results.

TABLE 4

| Example | Total height | Oil layer | Oil Exudation |
| --- | --- | --- | --- |
| 1 | 175 mm | No free oil | 0.0% |
| 2 | 177 mm | No free oil | 0.0% |
| Compararive A | 175 mm | 4 mm | 2.3% |
| Comparative B | 174 mm | 0.5 mm | 0.3% |

The invention claimed is:

1. A process for continuously mixing a first liquid edible oil and a second liquid edible oil in a mixing apparatus, comprising the steps of:
    a) feeding the first liquid edible oil and the second liquid edible oil into the mixing apparatus; and
    b) mixing the first liquid edible oil and the second liquid edible oil;
        wherein the first liquid edible oil is liquid at 15° C. and which first liquid edible oil enters the mixing apparatus at a temperature of between −5° and 20° C.;
        wherein the second liquid edible oil is solid at 15° C. and liquid at 75° C. and which second liquid edible oil enters the mixing apparatus at a temperature of between 30° and 110° C.;
        wherein the flow rate of the second liquid edible oil fed to the mixing apparatus is between 1 and 20% of the flow rate of first and second liquid edible oil combined and being fed to the mixing apparatus; and
    wherein characterised in that the mixing apparatus is a multi-inlet vortex mixer having at least three inlets.

2. The process of claim 1, wherein the multi-inlet vortex mixer has from 3 to 9 inlets.

3. The process of claim 1, wherein the first liquid edible oil and the second liquid edible oil are fed to the multi-inlet vortex mixer at a pressure of between 5 and 100 bar.

4. The process of claim 1, wherein the second liquid edible oil enters the mixing apparatus at a temperature of at least 40° and not higher than 20° C. above the temperature at which all of the second liquid edible oil is melted.

5. The process of claim 1, wherein the second liquid edible oil is a fully hardened vegetable oil.

6. The process of claim 1, wherein the first liquid edible oil is a vegetable oil or mixture of vegetable oils.

7. The process of claim 1, wherein the residence time of the liquid edible oils in the multi-inlet vortex mixer is from 0.001 to 0.5 seconds.

8. The process of claim 1, wherein the second liquid edible oil is fed to the multi-inlet vortex mixer through one inlet, and the other inlets are used for feeding to the mixer the liquid edible oil.

9. A process for mixing a first liquid edible oil and a second liquid edible oil in a mixing apparatus, comprising the steps of:

a) feeding the first liquid edible oil and the second liquid edible oil into the mixing apparatus, wherein the mixing apparatus is a multi-inlet vortex mixer; and b) mixing the first liquid edible oil and the second liquid edible oil;

wherein the first liquid edible oil has a temperature at least 10° C. lower than the temperature of the second liquid edible oil, and wherein the mixing is a continuous process.

10. The process of claim 9, wherein the first liquid edible oil is liquid at 15° C. and wherein the second liquid edible oil is solid at 15° C.

11. The process of claim 9, wherein the second liquid edible oil is fed to the multi-inlet vortex mixer through one inlet.

12. The process of claim 2, wherein the multi-inlet vortex mixer has from 3 to 6 inlets.

13. The process of claim 2, wherein the multi-inlet vortex mixer has 3 or 4 inlets.

14. The process of claim 3, wherein the first liquid edible oil and the second liquid edible oil are fed to the multi-inlet vortex mixer at a pressure of between 8 and 80 bar.

15. The process of claim 3, wherein the first liquid edible oil and the second liquid edible oil are fed to the multi-inlet vortex mixer at a pressure of between 10 and 50 bar.

16. The process of claim 7, wherein the residence time of the liquid edible oils in the multi-inlet vortex mixer is from 0.002 to 0.2 seconds.

\* \* \* \* \*

UNITED STATES PATENT AND TRADEMARK OFFICE
CERTIFICATE OF CORRECTION

PATENT NO. : 11,510,418 B2
APPLICATION NO. : 16/633533
DATED : November 29, 2022
INVENTOR(S) : Frederik Michiel Meeuse et al.

It is certified that error appears in the above-identified patent and that said Letters Patent is hereby corrected as shown below:

On the Title Page

Item [72] please delete the third inventor's name and substitute therefor -- Özgür Günyol --.

Signed and Sealed this
Tenth Day of January, 2023

Katherine Kelly Vidal
Director of the United States Patent and Trademark Office